US006443724B1

(12) United States Patent
Jerklind et al.

(10) Patent No.: US 6,443,724 B1
(45) Date of Patent: Sep. 3, 2002

(54) FORMING TOOL

(75) Inventors: Jonas Jerklind, Klarenthal; Pär Sundqvist, Püttlingen, both of (DE)

(73) Assignee: SKF Nova AB, Göteborg (SE)

( * ) Notice: Subject to any disclaimer, the term of this patent is extended or adjusted under 35 U.S.C. 154(b) by 0 days.

(21) Appl. No.: 09/692,053

(22) Filed: Oct. 20, 2000

(51) Int. Cl.[7] ................ B29C 45/14
(52) U.S. Cl. ................ 425/411; 425/421; 425/419
(58) Field of Search ................ 425/411, 419, 425/421, 425, 412

(56) References Cited

U.S. PATENT DOCUMENTS

| | | | | | |
|---|---|---|---|---|---|
| 3,225,410 | A | * | 12/1965 | Boyer | 100/214 |
| 3,599,578 | A | * | 8/1971 | Sato | 425/157 |
| 3,659,985 | A | | 5/1972 | Marshall et al. | 425/78 |
| 3,773,446 | A | * | 11/1973 | Borrini | 425/149 |
| 4,008,021 | A | | 2/1977 | Fedrigo et al. | 425/3 |
| 4,064,734 | A | | 12/1977 | Pahnke | 72/455 |
| 4,260,346 | A | * | 4/1981 | Anderson et al. | 425/352 |
| 4,298,563 | A | | 11/1981 | DeSantis et al. | 264/111 |
| 5,755,848 | A | * | 5/1998 | Tsuchimoto et al. | 425/412 |

FOREIGN PATENT DOCUMENTS

| | | |
|---|---|---|
| SU | 1018802 | 1/1982 |
| WO | 9700751 | 1/1997 |
| WO | 99/51426 | 10/1999 |

* cited by examiner

*Primary Examiner*—Nam Nguyen
*Assistant Examiner*—Joseph S Del Sole
(74) *Attorney, Agent, or Firm*—Burns, Doane, Swecker & Mathis, L.L.P.

(57) ABSTRACT

A forming tool has a die with a seat for receiving material to be formed, an upper punch axially movable into and out of the seat from one side of the die, a lower punch axially movable into and out of the seat from the opposite side of the die, a movable loading device for introducing the material into the seat, an impact press for subjecting the upper punch to a series of compacting impacts, a unit for supplying drive force to the tool and a control device for controlling the motion of the movable parts of the tool. An impact head is positioned above the die, supports the upper punch, and receives the compacting impacts delivered by the impact press. The impact head is guided and aligned with a cavity in the die by a vertically adjustable roof. The impact head is thereby mechanically disengaged from the roof.

8 Claims, 3 Drawing Sheets

FORMING TOOL

TECHNICAL FIELD

The present invention refers to a tool for forming material bodies, e.g., by compacting powder, preferably using a high velocity compacting (HVC) method, wherein a punch acting to shape and compact the material in a die is subjected to a series of very short-timed and very powerful impacts with velocities above approximately 1 m/s, and preferably over 2 m/s.

BACKGROUND OF THE INVENTION

In conventional press tools the upper punch is fixedly mounted on the unit delivering the pressing force into the tool. Such an arrangement, however, is generally not suitable for high velocity compacting, as tests have shown that any component which has been mounted directly on the impact plunge will break down within a very short period of time due to the intense and repeated impacts to which the compacting tool is subjected during the high velocity compacting.

Accordingly, there exists a need for a tool suitable for high velocity compacting where, on one hand, the upper punch is not mounted directly on the impact plunge and which, on the other hand, does not interfere with charging of the compacting cavity with powder material or the like.

SUMMARY OF THE INVENTION

The purpose of the present invention is therefore to provide a forming or compacting tool in which the above-described problem has been eliminated. The present invention achieves this goal by providing a forming tool having a die with a seat for receiving a material to be formed, an upper punch axially movable into and out of the seat from one side of the die, a lower punch axially movable into and out of the seat from the opposite side of the die, movable loading means for introduction of the material into the seat, an impact press arranged to subject the upper punch to a series of compacting impacts, a unit for supplying a driving force to the tool, and a control device for controlling the motion of the movable parts of the tool. The forming tool further includes an impact head positioned above the die and supporting the upper punch. The impact head is arranged to receive the compacting impacts delivered by the impact press. Further, the impact head is guided and centered in a position aligned with the seat in the die by a vertically adjustable roof supported in a tool housing. The impact head is thereby mechanically disengaged from the roof for substantially preventing impact forces from propagating into the tool housing.

According to a further aspect of the present invention, the roof is provided with a center aperture through which the impact head extends. The roof aperture has a lower mechanical stop and an upper mechanical stop which are spaced apart in an axial direction. The impact head has an external flange of a height less than a distance between the two mechanical stops of the roof, and the flange has a predetermined size which prevents movement of the flange below the lower mechanical stop and above the upper mechanical stop. The flange is thus positioned during impacts between the upper and lower mechanical stops.

A further aspect of the present invention is directed to an improvement in a forming tool comprising a die with a seat for receiving a material to be formed, an upper punch axially movable into and out of the seat from one side of the die, a lower punch axially movable into and out of the seat from the opposite side of the die, and an impact press arranged to subject the upper punch to a series of compacting impacts. The improvement of the present invention comprises an impact head positioned above the die and supporting the upper punch, with the impact head being arranged to receive the compacting impacts delivered by the impact press. The impact head is guided and centered in a position aligned with the seat in the die by a vertically adjustable roof supported in a tool housing. Moreover, the impact head is mechanically disengaged from the roof for substantially preventing impact forces from propagating into the tool housing. In a preferred embodiment of the present invention, the impact head further includes a projecting flange and the roof includes an upper mechanical stop and a lower mechanical stop. The flange of the impact head is retained between the upper and lower mechanical stops; however, when the upper punch is subjected to the series of compacting impacts, the flange does not contact the upper and lower mechanical stops. Thus, propagation of the impact forces is prevented.

Still further, another aspect of the present invention provides an impact head arrangement for supporting an upper punch in a forming tool. The arrangement comprises an impact head and a vertically adjustable roof for guiding and centering said impact head, wherein the impact head is mechanically disengaged from the roof during compacting impacts such that impact forces are substantially prevented from propagating to the forming tool. In a preferred embodiment of the present invention, the impact head further includes a projecting flange and the roof includes an upper mechanical stop and a lower mechanical stop, with the flange of the impact head being retained between the upper and lower mechanical stops. When the upper punch is subjected to a series of compacting impacts, however, the flange does not contact the upper and lower mechanical stops of the roof and propagation of the impact forces to the forming tool is thereby substantially prevented.

BRIEF DESCRIPTION OF THE DRAWINGS

Hereinafter the invention will be further described with reference to a non-limiting embodiment, shown in the accompanying drawings.

DETAILED DESCRIPTION OF THE INVENTION

Figure 1:
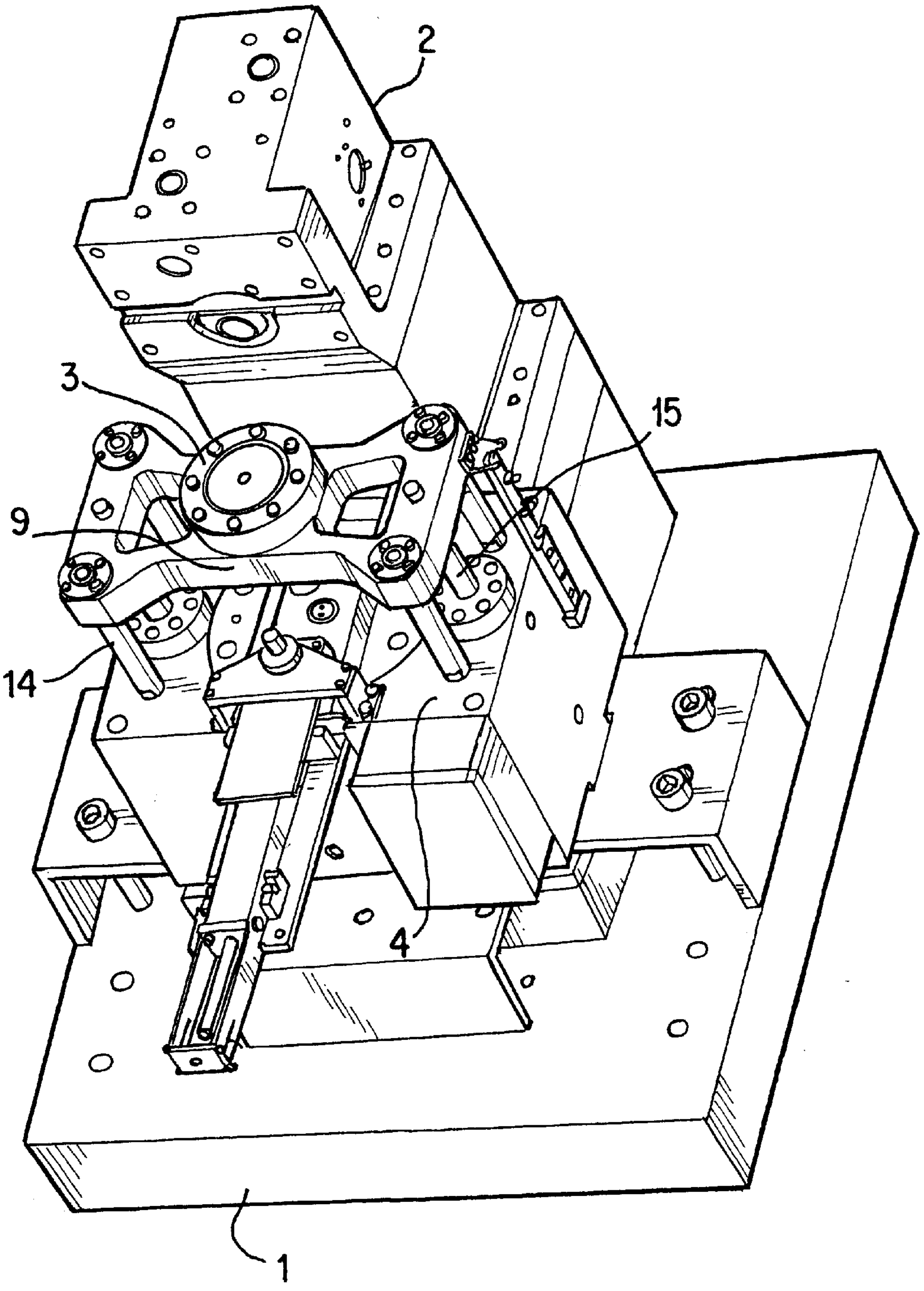
FIG. 1 is a perspective view of a compacting tool in accordance with the present invention as seen slightly from above.

FIG. 1 shows in a perspective view slightly from above the tool housing of a powder compacting tool mounted on a base 1 and comprising in combination an impact press 2, which via a impact unit 2' (shown in dash-lines in FIG. 3) and incorporating an impact piston (not shown) which transfers energy to an impact head 3 of the tool housing 4. Finally the tool has a control system (not shown), which controls the power supply of the impact press and the number of impacts transferred to the impact head 3.

Figure 2:
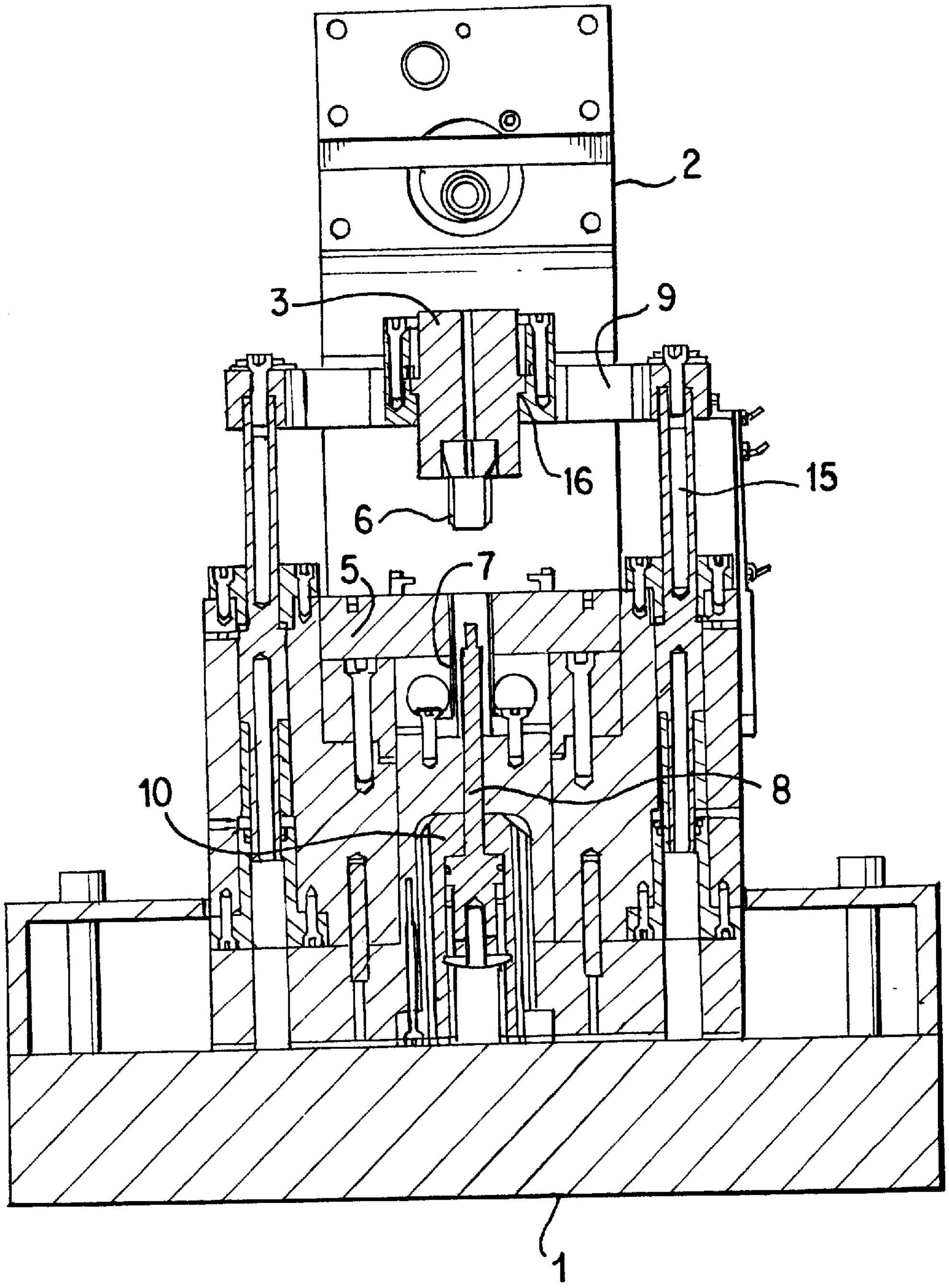
FIG. 2 is a planar front view partly in section of the tool in FIG. 1.
Figure 3:
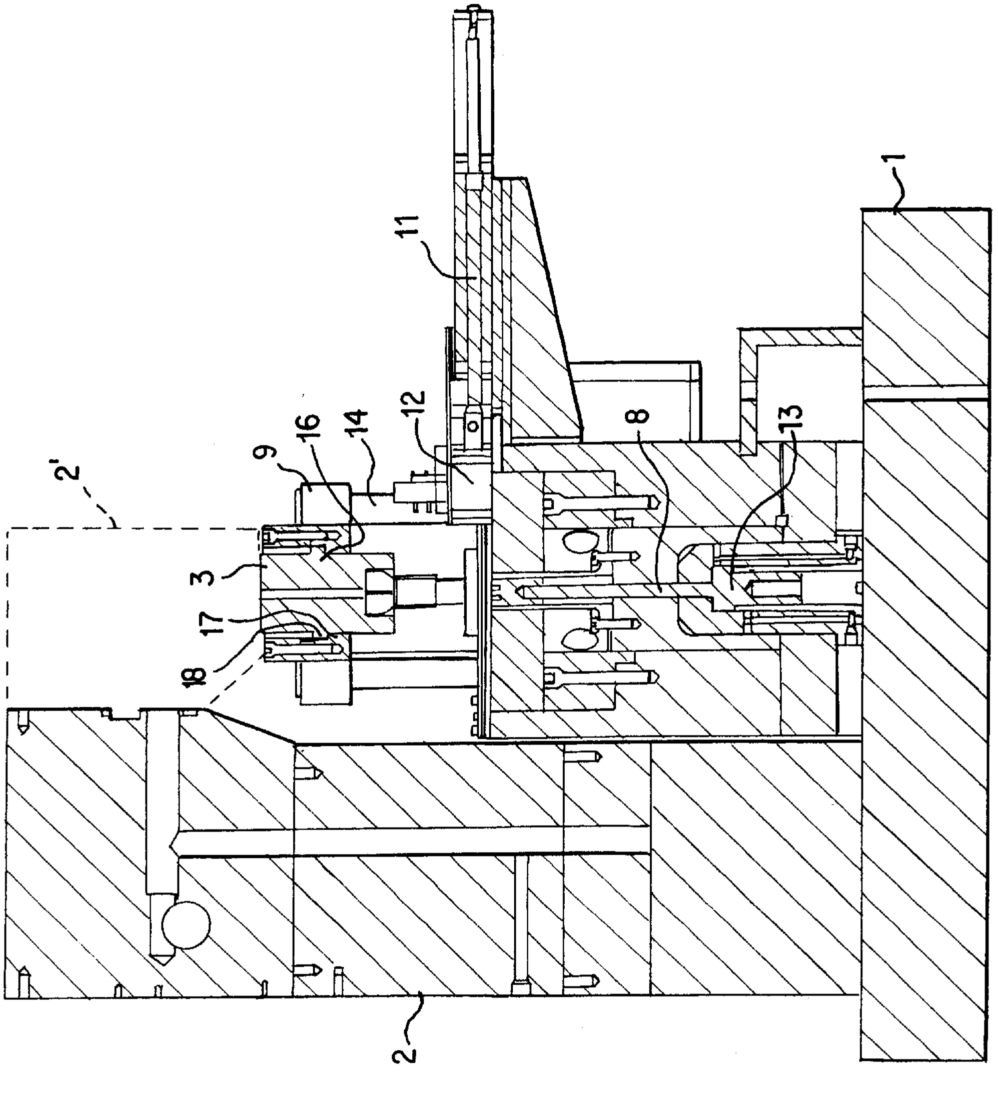
FIG. 3 shows in a sectional side view the tool according to FIGS. 1 and 2.

As can be better seen in FIG. 2 and FIG. 3, the tool housing 4 incorporates a shaping tool having four major parts: a die 5, an upper punch 6, a lower punch 7 and—as the press in the illustrated embodiment is intended for producing ring members—a core 8. The upper punch 6 is fixedly connected to the impact head 3, via a clamping sleeve, which is screwed on to the impact head. The tool housing 4 further incorporates the following four movable elements, a roof 9, which is arranged to displace the upper punch 6 in a vertical direction, a first plunge 10 which is arranged to displace the lower punch 7, a filling shoe piston 11 (FIG. 3), which displaces a filling shoe 12 between a neutral position and a filling position above the form cavity in the die, and a second plunge 13 which is arranged for moving the core 8 in a vertical direction. The impact head 3 is guided in the roof 9 by guiding belts (not shown), which permit a rapid vertical movement while maintaining coaxial alignment with the die 5. All movements involved are preferably effected by propulsion from the hydraulic unit and they are controlled by the control system. During an impact, the impact head 3 is thus completely free-moving in the vertical direction and is intercepted only by the powder volume in the die 5. As such, the impact head 3 is mechanically disengaged from the roof 9 and impact forces are substantially prevented from propagating into the tool housing 4 and causing damage thereto, as found in the prior art.

In the initial position of the forming sequence, the upper punch 6, the lower punch 7, and the core 8 are all in their uppermost positions, such as illustrated in the figures. The filling shoe 12 is in its neutral position. During the forming sequence the powder-filled filling shoe 12 is first pushed by the filling shoe piston 11 to a filling position above the cavity of the die 5. The lower punch 7 is then moved downward to its filling position and the powder that has been positioned in the filling shoe 12 above the forming cavity is sucked down into the cavity by the action of the lower punch 7. The filling shoe 12 thereupon is retracted to its neutral position by means of the piston 11.

Thereafter, the roof 9 is moved downwards with the upper punch 6 centered such that it will engage the powder contained in the cavity. The roof 9 continues a short distance downwards thereby urging the upper punch 6 downwards against the powder.

The lower punch 7 is moved further downwards to the impact position (end position). Due to the attraction of gravity, the upper punch 6 will thereby follow the downward movement of the lower punch 7.

Thereafter, the impact head 3, which is connected to the upper punch 6 is subjected to a number of impacts delivered by the impact plunge (not shown) of the press 2 and controlled as to power and number by the control system. In the preferred embodiment as illustrated, this results in compacting of the powder contained in the forming cavity to a ring member.

The impact plunge is then returned. The roof 9 also moves upwards to the initial position and thereby carries along the upper punch 6.

The core 8 thereupon is moved down to its end position and thereby releases itself from the ring that has been compacted.

The lower punch 7 is similarly moved up to its initial position thereby exposing the compacted ring, which then can be removed. Finally, the core 8 is moved up to its initial position, whereupon a new forming sequence can start.

As stated above, conventional press tools have an upper punch which is fixedly mounted on the unit delivering the pressing force into the tool. Such a solution is generally not desirable in the case of high velocity compacting, however, because components mounted directly on the impact plunge will break down within a very short period of time due to the intense and repeated impacts to which the compacting tool is subjected. The problem confronting the present inventors, therefore, was to find a solution which on one hand was not mounted directly on the impact plunge and which on the other hand would not disturb the powder filling sequence.

For this purpose, the arrangement is such that the vertical movement of the roof 9 is guided and centred by four guide pins 14, which are fixedly attached to the tool housing 4 and extend through openings positioned at the corners of the roof 9. The roof 9 is preferably equipped with two hydraulic pistons 15, which effect movement of the roof.

The impact head 3 is provided and centered in the center of the roof 9, and the upper punch 6 is affixed to the lower part of the impact head. The impact head 3 is accurately centered in the roof with small tolerances, but it is freely movable in the vertical direction. The impact head 3 is equipped with a flange 16, resting upon a mechanical stop 17 at the lower side of the roof 9, and this prevents the impact head 3 from passing through the roof 9. After mounting of the impact head 3, an upper mechanical stop 18 is also attached to the upper side of the roof. The distance between the upper and lower mechanical stops 17, 18 is chosen so that the impact head 3 during the impact is intercepted only by the component to be formed and it will never be in contact with anyone of the stops. During the impacts, the roof 9 is not displaced or acted upon so as to avoid pressure peaks from the hydraulic pistons that control the roof and to also avoid any uneven loads.

The function of the roof is described by the following:

When the roof 9 is in its initial position (upper position), the impact head 3 rests on the lower mechanical stop 17 of the roof. Then the roof 9 is moved downwards, and the upper punch 6 hits the powder contained in the die cavity, whereby the movement of the impact head 3 is stopped. However, the roof 9 will continue its downward movement until the upper mechanical stop 18 of the roof 9 hits the flange 16 of the impact head 3 and presses the upper punch 6 against the powder and, in this manner, a pre-compacting of the powder is obtained. In this position the impact head 3 is exposed and can move freely downwards and it is thus in position for impact work. After the impact operation which effects compacting of the powder, the roof 9 is moved upwards and the lower mechanical stop 17 will hit the flange 16 of the impact head 3, thereby carrying the impact head 3 and the upper punch 6 to the upper position for the roof 9. The impact head 3 must be moved high enough to provide space for the filling shoe 12 to pass below the upper punch 6 during the filling of the powder.

Due to this design of the tool housing 4 and particularly of the roof 9 and the impact head 3, the above-described problems of the prior art are obviated.

Although the invention has been illustrated and described with reference to a specific and detailed embodiment, it is evident that the invention is not limited thereto but modifications and variants are possible within the scope of the accompanying claims. Thus the tool has been shown and described in the form of a compacting tool for producing powder metal bodies, but the same type of press with its free-floating impact head, can be used for all types of material such as also homogenous or porous materials.

What is claimed is:

1. A forming tool comprising:

a die with a seat for receiving a material to be formed, an upper punch axially movable into and out of said seat from one side of the die, a lower punch axially movable into and out of said seat from the opposite side of the die, movable loading means for introduction of the material into said seat, an impact press arranged to subject the upper punch to a series of compacting impacts, a unit for supplying driving force to the tool and a control device for controlling the motion of the movable parts of the tool, an impact head positioned above the die and supporting the upper punch, said impact head arranged to receive the series of compacting impacts delivered by the impact press, said impact head guided and centered in a position aligned with the seat in the die by a vertically adjustable roof, the impact head is movable relative to the roof, the roof is provided with a center aperture through which the impact head extends, the center aperture provided with a lower mechanical stop and an upper mechanical stop spaced apart in an axial direction, said impact head having an external flange of a height less than a distance between the two mechanical stops of the roof, said flange preventing movement of said flange below the lower mechanical stop and above the upper mechanical stop, said flange positioned between said upper and lower mechanical stops.

2. A forming tool as claimed in claim 1, wherein the forming tool is arranged as a powder compacting tool, whereby the seat for the material to be formed is a powder compacting cavity for a volume of a powder material, which is introduced therein via said movable loading means, said movable loading means comprising a filling shoe.

3. A forming tool as claimed in claim 1, wherein the roof is movably guided on a plurality of guide pins and vertically adjustable by power pistons.

4. A forming tool as claimed in claim 1, including a plurality of guide pins each extending through a respective opening in the roof, and wherein the lower mechanical stop of the roof is situated at such a height that a filling shoe can be moved in below the upper punch for filling a cavity defined by the seat, when the impact head is in an uppermost position.

5. A forming tool comprising a die with a seat for receiving a material to be formed, an upper punch axially movable into and out of the seat from one side of the die, a lower punch axially movable into and out of the seat from the opposite side of the die, and an impact press arranged to subject the upper punch to a series of compacting impacts, an impact head positioned above the die and supporting the upper punch, said impact head being arranged to receive the series of compacting impacts delivered by the impact press, said impact head guided and centered in a position aligned with the seat in the die by a vertically adjustable roof, the impact head movable relative to the roof and including an external flange, said roof including an upper mechanical stop and a lower mechanical stop, said flange of said impact head is retained between said upper and lower mechanical stops.

6. The forming tool as claimed in claim 5, wherein the roof includes an aperture through which the impact head extends, and wherein, when the upper punch is subjected to the series of compacting impacts, said flange does not contact said upper and lower mechanical stops.

7. The forming tool as claimed in claim 5, wherein vertical movement of said roof is guided by a plurality of guide pins.

8. The forming tool as claimed in claim 5, further comprising at least one piston for vertically moving said roof.

* * * * *

UNITED STATES PATENT AND TRADEMARK OFFICE

CERTIFICATE OF CORRECTION

PATENT NO. : 6,443,724 B1 Page 1 of 1
DATED : September 3, 2002
INVENTOR(S) : Jonas Jerklind and Pär Sundqvist It is certified that error appears in the above-identified patent and that said Letters Patent is hereby corrected as shown below:

Title page,
Please insert the following information: -- [30] Foreign Application Priority Data
October 22, 1999 (SE) ..........................9903812-7 --

Signed and Sealed this

First Day of April, 2003

JAMES E. ROGAN
*Director of the United States Patent and Trademark Office*